United States Patent
Beck et al.

(10) Patent No.: US 9,618,095 B2
(45) Date of Patent: Apr. 11, 2017

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 152 days.

(21) Appl. No.: 14/410,724

(22) PCT Filed: May 14, 2013

(86) PCT No.: PCT/EP2013/059881
§ 371 (c)(1),
(2) Date: Apr. 9, 2015

(87) PCT Pub. No.: WO2014/000944
PCT Pub. Date: Jan. 3, 2014

(65) Prior Publication Data
US 2015/0300460 A1    Oct. 22, 2015

(30) Foreign Application Priority Data

Jun. 26, 2012 (DE) ........................ 10 2012 210 860

(51) Int. Cl.
*F16H 3/66* (2006.01)
(52) U.S. Cl.
CPC ..... *F16H 3/666* (2013.01); *F16H 2200/0069* (2013.01); *F16H 2200/2012* (2013.01);
(Continued)
(58) Field of Classification Search
CPC ..... F16H 2200/0069; F16H 2200/2012; F16H 2200/2046; F16H 2200/2064; F16H 2200/2094; F16H 2200/2097; F16H 3/666
See application file for complete search history.

(56) References Cited

U.S. PATENT DOCUMENTS 6,960,149 B2 * 11/2005 Ziemer ............... F16H 3/66
                                                   475/276
7,695,398 B2 *  4/2010 Phillips ............. F16H 3/666
                                                   475/278
(Continued)

FOREIGN PATENT DOCUMENTS

DE         101 62 888          7/2003
DE      10 2009 019 046        11/2010
(Continued)

OTHER PUBLICATIONS

German Search Report, Feb. 6, 2013.
PCT Search Report, Jul. 24, 2013.

*Primary Examiner* — Derek D Knight
*Assistant Examiner* — David Morris
(74) *Attorney, Agent, or Firm* — Dority & Manning, P.A.

(57) ABSTRACT

A multi-speed transmission has four planetary gear sets, eight rotatable shafts and six shifting elements. The sun gear of the first planetary gear set is connected to the third shaft. The input shaft is detachably connectable to the fourth shaft. The input shaft is connected to the sun gear of the fourth planetary gear set. The eighth shaft is connected to the ring gear of the first planetary gear set, the sun gear of the second planetary gear set, and the sun gear of the third planetary gear set. The fifth shaft is connected to the bar of the second planetary gear set and the ring gear of the third planetary gear set and is detachably connectable to the seventh shaft. The sixth shaft is connected to the ring gear of the second planetary gear set and is detachably connectable to the output shaft of the transmission.

6 Claims, 2 Drawing Sheets

(52) U.S. Cl.
CPC .............. *F16H 2200/2046* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 8,210,981 | B2 | 7/2012 | Bauknecht et al. |
| 8,303,454 | B1 * | 11/2012 | Shim ........................ F16H 3/66 475/280 |
| 9,212,729 | B2 * | 12/2015 | Beck ........................ F16H 3/666 |
| 9,222,553 | B2 * | 12/2015 | Beck ........................ F16H 3/666 |
| 2008/0242487 | A1 * | 10/2008 | Hart ........................ F16H 3/666 475/276 |
| 2009/0017964 | A1 | 1/2009 | Phillips et al. |
| 2013/0040776 | A1 * | 2/2013 | Mellet ..................... F16H 3/666 475/275 |

FOREIGN PATENT DOCUMENTS

| | | |
|---|---|---|
| DE | 10 2009 054 105 | 5/2011 |
| JP | 2006 349 153 | 12/2006 |

* cited by examiner

| Gear | Closed Shifting Elements | | | | | | Transmission Ratio i | Gear Steps φ |
|---|---|---|---|---|---|---|---|---|
| | Brake | | Coupling | | | | | |
| | 03 | 04 | 57 | 14 | 13 | 26 | | |
| 1 | | X | X | | X | | 5,086 | |
| 2 | X | X | X | | | | 3,350 | 1,518 |
| 3 | | X | X | | | X | 2,220 | 1,509 |
| 4 | X | | X | | | X | 1,531 | 1,450 |
| 5 | | | X | | X | X | 1,267 | 1,208 |
| 6 | | | X | X | | X | 1,000 | 1,267 |
| 7 | | | X | X | X | | 0,864 | 1,157 |
| 8 | | | | X | X | X | 0,681 | 1,269 |
| 9 | X | | | X | | X | 0,565 | 1,205 |
| R | | X | | | X | X | −3,310 | Total 9,002 |
| Z1 | X | | X | X | | | 0,794 | |

Fig. 2

MULTI-SPEED GEARBOX

FIELD OF THE INVENTION

The present invention relates to a multi-speed transmission in planetary design, in particular an automatic transmission for a motor vehicle.

BACKGROUND

According to the state of the art, automatic transmissions, in particular for motor vehicles, comprise planetary gear sets that are shifted by means of friction elements or shifting elements and are typically connected to a start-up element that is subject to a slip effect and is alternatively provided with a lock-up clutch, such as a hydrodynamic torque converter or a fluid coupling.

In general, automatically shiftable vehicle transmissions in planetary design are already described in the state of the art, and are subject to continuous development and improvement. Thus, such transmissions should require low construction costs, in particular a small number of shifting elements, and, upon a sequential shifting operation, should avoid double gearshifts, i.e. the switching on and off of two shifting elements, such that, during gearshifts in defined gear groups, only one shifting element is changed.

A multi-speed transmission in planetary design is known from DE 10 2008 000 428 A1 that features an input and an output, which are arranged in a housing. With this known transmission, at least four planetary gear sets, hereafter referred to as the first, second, third and fourth planetary gear sets, at least eight rotatable shafts—hereafter referred to as the input shaft, output shaft, third, fourth, fifth, sixth, seventh and eighth shaft—along with at least six shifting elements, comprising brakes and couplings, are provided; their selective intervening brings about different transmission ratio relationships between the input and the output, such that, preferably, nine forward gears and one reverse gear are able to be realized.

Thereby, the first and the second planetary gear sets, which are preferably formed as negative planetary gear sets, thus with a negative stationary transmission ratio, a shiftable upstream gear set, whereas the third and the fourth planetary gear sets form a main gear set.

According to the state of the art, the shifting elements of the multi-stage transmissions designed in such a manner, which are typically designed as multi-disk couplings or brakes, are hydraulically actuated, which leads to high hydraulic losses in a disadvantageous manner. In order to avoid these actuating losses, the use of alternatively actuatable shifting elements, for example electromechanically actuatable shifting elements, would be particularly advantageous.

In order to enable the use of actuatable shifting elements in line with demand, the shifting elements, in particular the couplings, must be easily accessible from the outside.

SUMMARY OF THE INVENTION

The present invention is subject to a task of proposing a multi-speed transmission of the aforementioned type, which features nine forward gears and one reverse gear and a sufficient transmission ratio, for which the construction costs, the component load and the component size are optimized, and which also improves efficiency regarding the drag losses and gearing losses. Moreover, the shifting elements of the transmission are to be easily accessible from the outside, by which the installation of actuatable shifting elements in line with demand is facilitated. In addition, the transmission is suitable for both standard design and a front-transverse design. Additional objects and advantages of the invention will be set forth in part in the following description, or may be obvious from the description, or may be learned through practice of the invention.

In accordance with the invention, the tasks are solved by the characteristics of a transmission described and claimed herein.

Accordingly, a multi-speed transmission in planetary design in accordance with the invention is proposed, which features an input and an output, which are arranged in a housing. Furthermore, at least four planetary gear sets, hereafter referred to as the first, second, third and fourth planetary gear sets, eight rotatable shafts—hereafter referred to as the input shaft, output shaft, third, fourth, fifth, sixth, seventh and eighth shafts—along with six shifting elements preferably designed as multi-disk shifting elements or as positive-locking shifting elements, comprising brakes and couplings, are provided; their selective intervening brings about different transmission ratio relationships between the input and the output, such that, preferably, at least nine forward gears and one reverse gear are able to be realized.

The first planetary gear set of the transmission is preferably designed as a positive planetary gear set, whereas the second, third, and fourth planetary gear sets of the transmission are preferably formed as negative planetary gear sets.

As is well known, a simple negative planetary gear set comprises a sun gear, a ring gear and a bar, on which the planetary gears are rotatably mounted, each of which meshes with the sun gear and the ring gear. Thereby, with a bar that is held down, the ring gear exhibits a direction of rotation opposite to the sun gear, and a negative stationary transmission ratio arises. By contrast, a compound positive planetary gear set comprises a sun gear, a ring gear and a bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, with a bar that is held down, the ring gear exhibits the same direction of rotation as the sun gear, and a positive stationary transmission ratio arises.

In accordance with the invention, the sun gear of the first planetary gear set is connected to the third shaft, which is detachably connectable to the input shaft through a first coupling and is attachable to the housing through a first brake, whereas the input shaft is, through a second coupling, detachably connectable to the fourth shaft connected to the bar of the third planetary gear set, which is attachable to the bar of the first planetary gear set through a second brake, which is coupled to the housing.

Furthermore, the input shaft is connected to the sun gear of the fourth planetary gear set, whereas the eighth shaft is connected to the ring gear of the first planetary gear set, the sun gear of the second planetary gear set and the sun gear of the third planetary gear set, and the fifth shaft is connected to the bar of the second planetary gear set and the ring gear of the third planetary gear set and is, through a third coupling, detachably connectable to the seventh shaft connected to the ring gear of the fourth planetary gear set. Viewed radially, the third coupling is preferably arranged near the housing.

In addition, the sixth shaft is connected to the ring gear of the second planetary gear set and is, through a fourth coupling, detachably connectable to the output shaft of the transmission, which is connected to the bar of the fourth planetary gear set.

By the fact that the first and second coupling are arranged on the input shaft of the transmission, the fourth coupling is arranged on the output shaft and the remaining shifting elements are designed as brakes, the easy accessibility of essentially all shifting elements of the transmission is ensured, by which the shifting elements can be designed as actuatable shifting elements in line with demand.

Furthermore, transmission ratios particularly suitable for passenger cars along with an increased overall spread of the multi-speed transmission arise, which results in an improvement in driving comfort and a significant reduction in consumption.

Moreover, with the multi-speed transmission in accordance with the invention, construction costs are significantly reduced, due to the low number of shifting elements. In an advantageous manner, with the multi-speed transmission in accordance with the invention, it is possible to perform a start with a hydrodynamic converter, an external starting clutch or other suitable external start-up elements. It is also possible to facilitate the start-up procedure with a start-up element integrated into the transmission. A shifting element that is actuated in the first forward gear and in the reverse gear is preferably suitable.

Furthermore, the multi-speed transmission in accordance with the invention gives rise to good efficiency in the main driving gears, based on the low drag losses and gearing losses.

In an advantageous manner, there are low torques on the shifting elements and on the planetary gear sets of the multi-speed transmission, which reduces the load for the multi-speed transmission in an advantageous manner. In addition, the low torques enable correspondingly low dimensioning, which reduces the required installation space and the corresponding costs. Furthermore, there are also low rotational speeds for the shafts, the shifting elements and the planetary gear sets.

In addition, the transmission in accordance with the invention is designed in such a manner that adaptability to the various drive train arrangements is enabled, both in the direction of the power flow and in spatial terms.

BRIEF DESCRIPTION OF THE DRAWINGS

In the following, the invention is more specifically illustrated as an example on the basis of the attached figures. The following are represented in these:

FIG. 2: an exemplary circuit diagram for a multi-speed transmission in accordance with FIG. 1.

DETAILED DESCRIPTION

Figure 1:
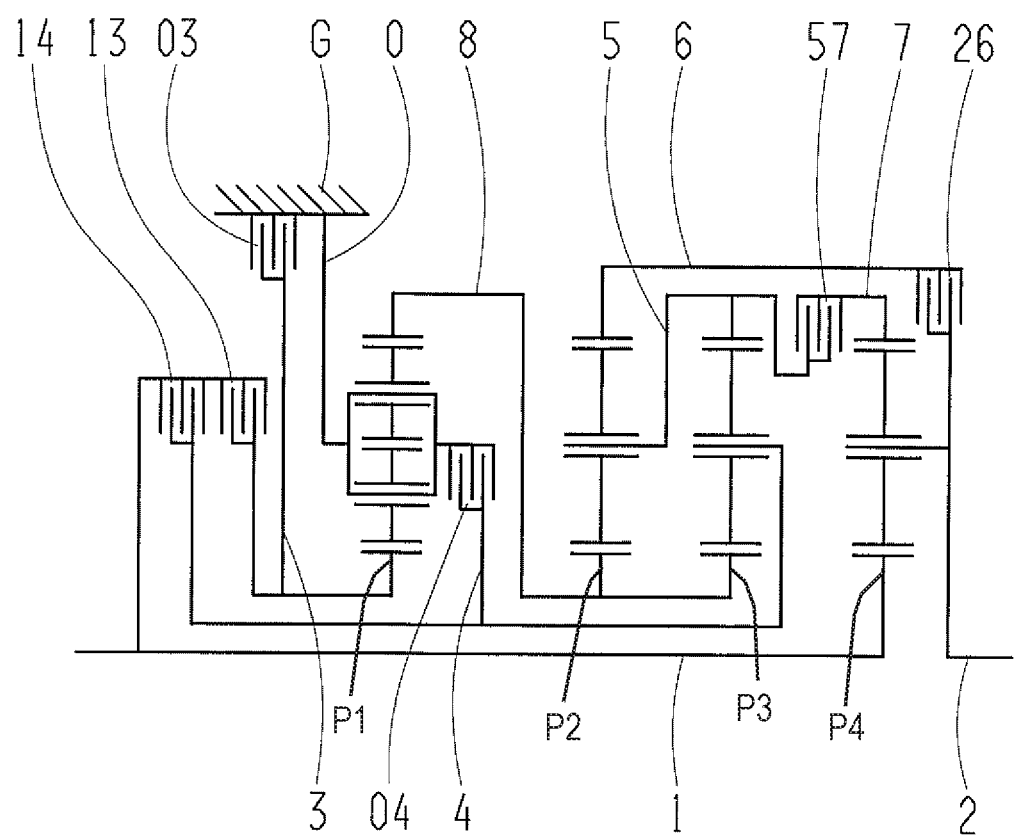
FIG. 1: a schematic view of a preferred embodiment of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a multi-speed transmission in accordance with the invention with an input shaft 1, an output shaft 2 and four planetary gear sets P1, P2, P3 and P4, which are arranged in a housing G. In the example shown in FIG. 1, the planetary gear set P1 is formed as a positive planetary gear set, whereas the second, third and fourth planetary gear sets P2, P3, P4 are formed as negative planetary gear sets. In accordance with the invention, at least one of the negative planetary gear sets P2, P3, P4 may be designed as a positive planetary gear set, if, at the same time, the bar connection and the ring gear connection are exchanged, and the amount of the stationary transmission ratio is increased by 1 compared to the design as a negative planetary gear set.

With the embodiment that is shown, the planetary gear sets P1, P2, P3, P4 are arranged, viewed axially, in the order of the first planetary gear set P1, the second planetary gear set P2, the third planetary gear set P3, the fourth planetary gear set P4. In accordance with the invention, the axial order of the individual planetary gear sets and the arrangement of the shifting elements are freely selectable, as long as this allows for the binding ability of the elements of the planetary gear sets.

As shown in FIG. 1, six elements, namely two brakes 03, 04 and four couplings 13, 14, 26, 57, are provided. The spatial arrangement of the shifting elements may be arbitrary, and is limited only by the dimensions and the external shaping. The couplings and brakes of the transmission are preferably designed as frictional shifting elements or multi-disk shifting elements, but may also be designed as positive-locking shifting elements.

With these shifting elements, a selective shifting of nine forward gears and one reverse gear can be realized. The multi-speed transmission in accordance with the invention features a total of eight rotatable shafts, namely the shafts 1, 2, 3, 4, 5, 6, 7 and 8, whereas the input shaft forms the first shaft 1 and the output shaft forms the second shaft 2 of the transmission.

In accordance with the invention, with the multi-speed transmission in accordance with FIG. 1, it is provided that the sun gear of the first planetary gear set P1 is connected to the third shaft 3, which is detachably connectable to the input shaft 1 through a first coupling 13 and is attachable to the housing G through a first brake 03, whereas the input shaft 1 is, through a second coupling 14, detachably connectable to the fourth shaft 4 connected to the bar of the third planetary gear set P3, which is attachable to the bar of the first planetary gear set P1 through a second brake 04, which is coupled to the housing G (shaft 0).

With reference to FIG. 1, the input shaft 1 is connected to the sun gear of the fourth planetary gear set P4, whereas the eighth shaft 8 is connected to the ring gear of the first planetary gear set P1, the sun gear of the second planetary gear set P2 and the sun gear of the third planetary gear set P3; the fifth shaft 5 is connected to the bar of the second planetary gear set P2 and the ring gear of the third planetary gear set P3 and is, through a third coupling 57, detachably connectable to the seventh shaft 7 connected to the ring gear of the fourth planetary gear set P4.

Furthermore, the sixth shaft 6 of the transmission is connected to the ring gear of the second planetary gear set P2 and is, through a fourth coupling 26, detachably connectable to the output shaft 2 of the transmission, which is connected to the bar of the fourth planetary gear set P4.

With the embodiment that is shown, the second brake 04 is particularly suitable for a design as a claw shifting element, by which consumption is significantly improved.

FIG. 2 shows an exemplary circuit diagram of a multi-speed transmission in accordance with FIG. 1. For each gear, three shifting elements are closed. As an example, the respective transmission ratios i of the individual gears and the gear steps or progressive steps φ, to be determined from these, for the next higher gear can be seen in the circuit diagram, whereas the value 9.002 represents the spread of the transmission.

For the example shown, the values for the stationary transmission ratios of the first, second, third and fourth planetary gear sets P1, P2, P3, P4 are 2.550, −3.425, −2.700 and −2.350, respectively. FIG. 2 shows that, upon a sequential shifting operation, only one shifting element must be switched on, and only one shifting element must be switched off, since two adjacent gears jointly use two shifting elements. It also shows that a large spread is achieved with small gear steps.

The first forward gear arises from the locking of the second brake 04 and the first and third couplings 13, 57, the second forward gear arises from the locking of the first and second brakes 03, 04 and the third coupling 57, the third forward gear arises from the locking of the second brake 04 and the third and fourth couplings 57, 26, the fourth forward gear arises from the locking of the first brake 03 and the third and fourth couplings 57, 26, the fifth forward gear arises from the locking of the first, third, and fourth couplings 13, 57, 26, the sixth forward gear, which in the example shown is designed as a direct gear, arises from the locking of the second, third and fourth couplings 14, 57, 26, the seventh forward gear arises from the locking of the first, second and third couplings 13, 14, 57, the eighth forward gear arises from the locking of the first, second and fourth couplings 13, 14, 26 and the ninth forward gear arises from the locking of the first brake 03 and the second and fourth couplings 14, 26, whereas the reverse gear arises from the locking of the second brake 04 and the first and fourth couplings 13, 26.

As an addition to the nine forward gears, an additional gear Z1 can be realized through the locking of the first brake 03 and the second and third couplings 14, 57; the transmission ratio of this is between the transmission ratios of the seventh and the eighth forward gears.

By the fact that, in the first forward gear and in the reverse gear, the second brake 04 and the first coupling 13 are closed, these shifting elements may be used as start-up elements.

In accordance with the invention, even with the same transmission scheme, different gear steps arise depending on the shifting logic, such that an application-specific or vehicle-specific variation is enabled.

In accordance with the invention, it is also optionally possible to provide additional freewheels at each suitable location of the multi-speed transmission, for example between one shaft and the housing, or, if applicable, in order to connect two shafts.

An axle differential and/or a distributor differential may be arranged on the input side or on the output side.

Within the framework of an advantageous additional form of the invention, if necessary, the input shaft 1 may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a start-up element in the direction of the power flow behind the transmission, whereas, in this case, the input shaft 1 is constantly connected to the crankshaft of the drive motor.

The multi-speed transmission in accordance with the invention also allows for the arrangement of a torsional vibration damper between the drive motor and the transmission.

Within the framework of an additional embodiment of the invention that is not shown, a wear-free brake, such as a hydraulic retarder or an electric retarder or the like, may be arranged at each shaft, preferably at the input shaft 1 or the output shaft 2; this is of particular importance for use in commercial vehicles. Furthermore, a power take-off may be provided for the drive of additional power units at each shaft, preferably at the input shaft 1 or the output shaft 2.

The frictional shifting elements that are used may be formed as power-shiftable couplings or brakes. In particular, force-fitting couplings or brakes, such as multi-disk couplings, band brakes and/or cone couplings, may be used.

An additional advantage of the multi-speed transmission presented here is that an electric motor can be installed at each shaft as a generator and/or as an additional drive motor.

Modifications and variations can be made to the embodiments illustrated or described herein without departing from the scope and spirit of the invention as set forth in the appended claims.

The invention claimed is:

1. A multi-speed automatic transmission for a motor vehicle, the transmission comprising:
   an input shaft, an output shaft, and four planetary gear sets arranged in a housing;
   six rotatable shafts in addition to the input shaft and the output shaft;
   six shifting elements, the shifting elements comprising brakes and couplings whose selective intervening brings about different transmission ratio relationships between the input shaft and the output shaft such that at least nine forward gears and one reverse gear are able to be realized;
   a sun gear of the first planetary gear set connected to a third shaft that is detachably connectable to the input shaft through a first coupling and is attachable to the housing through a first brake;
   the input shaft, through a second coupling, detachably connectable to a fourth shaft that is connected to a bar of the third planetary gear set, which is attachable to a bar of the first planetary gear set through a second brake that is coupled to the housing;
   the input shaft connected to a sun gear of the fourth planetary gear set;
   an eighth shaft connected to a ring gear of the first planetary gear set, a sun gear of the second planetary gear set, and a sun gear of the third planetary gear set;
   a fifth shaft connected to a bar of the second planetary gear set and a ring gear of the third planetary gear set and, through a third coupling, detachably connectable to a seventh shaft that is connected to a ring gear of the fourth planetary gear set; and
   a sixth shaft connected to a ring gear of the second planetary gear set and, through a fourth coupling, detachably connectable to the output shaft that is connected to a bar of the fourth planetary gear set.

2. The multi-speed automatic transmission according to claim 1, wherein the first planetary gear set is formed as a positive planetary gear set, the second, third and fourth planetary gear sets are formed as negative planetary gear sets.

3. The multi-speed automatic transmission according to claim 1, wherein the planetary gear sets are arranged, viewed axially, in the order of the first planetary gear set, the second planetary gear set, the third planetary gear set, and the fourth planetary gear set.

4. The multi-speed automatic transmission according to claim 1, wherein shifting elements are designed as in-line shifting elements.

5. The multi-speed automatic transmission according to claim 1, characterized in that the second brake is designed as a positive-locking shifting element.

6. The multi-speed automatic transmission according to claim 1, wherein:
   the first forward gear arises from locking of the second brake and the first and third couplings;
   the second forward gear arises from locking of the first and second brakes and the third coupling;
   the third forward gear arises from locking of the second brake and the third and fourth couplings;
   the fourth forward gear arises from locking of the first brake and the third and fourth couplings;
   the fifth forward gear arises from locking of the first, third, and fourth couplings;
   the sixth forward gear arises from locking of the second, third and fourth couplings;
   the seventh forward gear arises from locking of the first, second and third couplings;
   the eighth forward gear arises from locking of the first, second and fourth couplings;
   the ninth forward gear arises from locking of the first brake and the second and fourth couplings;
   the reverse gear arises from locking of the second brake and the first and fourth couplings; and
   an additional gear can be realized through locking of the first brake and the second and third couplings, the additional gear having a transmission ratio between the transmission ratios of the seventh and the eighth forward gears.

* * * * *